United States Patent Office 2,913,312
Patented Nov. 17, 1959

2,913,312

PURIFICATION OF TITANIUM BORIDE

Michael Dubeck, West Lafayette, Ind., assignor to Union Carbide Corporation, a corporation of New York No Drawing. Application November 4, 1954
Serial No. 466,935

5 Claims. (Cl. 23—204)

This invention relates to a process for the purification of titanium boride and particularly to a process for the removal from titanium boride of contaminants, such as carbon and carbides.

Titanium boride is an extremely hard material having a hardness of over 9 on Mohs' scale. In addition to this hardness it retains much of its strength at extremely high temperatures. These properties of titanium boride render it suitable for use as an abrasive either in powder form or when coated on a rigid backing member. Titanium boride is also used as a refractory, and metal cutting tools may be fashioned from it by bonding particles of titanium boride together with iron, cobalt, nickel, or other metals.

As a result of the procedures usually employed in making it, carbon, boron oxide and boron carbide are common contaminants of titanium boride. Such materials tend to lessen the abrasiveness of titanium boride and weaken tools or refractory materials fashioned from titanium boride.

Boric oxide may be conveniently removed from titanium boride by leaching with hot water. The same technique is effective in the removal of other water-soluble materials. Certain contaminants such as iron might be effectively removed with an acid leach—hydrochloric acid being suitable for many such purifications. Carbon and boron carbide do not, however, lend themselves readily to removal by leaching.

It is the principal object of the present invention to provide a process for the purification of titanium boride which is contaminated with carbon or carbides.

The object of the invention is accomplished by treating the contaminated titanium boride with magnesium oxide, in the manner described below, followed by a leaching operation, preferably with strong acid. The following description of the treatment of a contaminated sample of titanium boride is illustrative of the manner in which the invention may be practiced. A 10-gram sample of titanium boride, which contained 5.9% boron carbide, was mixed with 6.4 grams of magnesium oxide and heated in an inert atmosphere, i.e. argon, for about 20 minutes at a temperature of 1800° C. The product was leached with hydrochloric acid leaving substantially pure titanium boride. The purity of the titanium boride was established by decomposing the product of the above reaction with hot nitric acid and dissolving the decomposed material in sulfuric acid. The absence of undissolved residue indicated the absence of carbon and boron carbide from the material.

In another example of the process of the invention, 100 grams of titanium boride having the following composition:

|  | Percent |
|---|---|
| Titanium 8 | 63.8 |
| Boron | 33.2 |
| Total carbon | 0.5 |
| Free carbon | 0.06 |
| Boron carbide | 1.61 | were heated with 30 grams of magnesium oxide for 45 minutes at 1950° C. The heating was conducted in a carbon crucible under an atmosphere of argon. The product was leached with strong hydrochloric acid and washed with hot water. Following this treatment the analysis of the material was as follows:

|  | Percent |
|---|---|
| Titanium | 68.0 |
| Boron | 30.6 |
| Total carbon | 0.05 |
| Free carbon | 0.05 |
| Boron carbide | Less than 0.2 |

The material to be purified should be in a finely divided state to facilitate the action of the magnesium oxide. The amount of magnesium oxide to be used will be determined by the amount of impurities present in the titanium boride. An excess of magnesium oxide has no apparent detrimental effect on the titanium boride. Further, the process may be repeated if necessary in the event that an initial treatment does not remove a sufficient quantity of the contaminants. The calcination is advantageously conducted at a temperature of from about 1800° C. to about 1950° C.

What is claimed is:

1. A process for the purification of titanium boride which contains at least one of the contaminants in the group consisting of free and combined carbon, said process comprising mixing said titanium boride with magnesium oxide and calcining the mixture.

2. A process for the purification of titanium boride which contains at least one of the contaminants in the group consisting of free and combined carbon, said process comprising mixing said titanium boride with magnesium oxide and calcining the mixture in an inert atmosphere.

3. A process for the purification of titanium boride which contains at least one of the contaminants in the group consisting of free and combined carbon, said process comprising mixing said titanium boride with magnesium oxide and calcining the mixture in an inert atmosphere at a temperature of from about 1800° C. to about 1950° C.

4. A process for the purification of titanium boride which is contaminated with free carbon, said process comprising mixing said titanium boride with magnesium oxide and calcining the mixture in an inert atmosphere.

5. A process for the purification of titanium boride which is contaminated with boron carbide, said process comprising mixing said titanium boride with magnesium oxide and calcining the mixture in an inert atmosphere.

References Cited in the file of this patent

FOREIGN PATENTS

| 415,066 | Great Britain | Aug. 15, 1934 |
| 655,051 | Great Britain | July 11, 1951 |

OTHER REFERENCES

Schwarzkopf et al.: "Refractory Hard Metals," 1953, pages 82, 277–279.

Kieffer et al.: "Zeitschrift für anorganische und allgemeine Chemie," vol. 268, No. 3, pp. 191–200, May 1952.

UNITED STATES PATENT OFFICE
CERTIFICATE OF CORRECTION

Patent No. 2,913,312                                              November 17, 1959

Michael Dubeck

It is hereby certified that error appears in the printed specification of the above numbered patent requiring correction and that the said Letters Patent should read as corrected below.

Column 2, line 2, for

"Titanium 8 ------ 63.8"

read

-- Titanium -------- 63.8 --.

Signed and sealed this 14th day of June 1960.

(SEAL)
Attest:

KARL H. AXLINE                                      ROBERT C. WATSON
Attesting Officer                                     Commissioner of Patents